(12) United States Patent
Li

(10) Patent No.: US 8,405,004 B2
(45) Date of Patent: Mar. 26, 2013

(54) INTELLIGENT ELECTRIC KETTLE

(76) Inventor: Wing Chung Li, Hong Kong (HK)

( * ) Notice: Subject to any disclaimer, the term of this patent is extended or adjusted under 35 U.S.C. 154(b) by 412 days.

(21) Appl. No.: 12/766,841

(22) Filed: Apr. 23, 2010

(65) Prior Publication Data
US 2011/0259871 A1 Oct. 27, 2011

(51) Int. Cl.
*F27D 11/00* (2006.01)
(52) U.S. Cl. ........................ 219/441; 99/323.3
(58) Field of Classification Search .............. 219/441; 99/323.3
See application file for complete search history.

(56) References Cited

U.S. PATENT DOCUMENTS
2004/0149729 A1* 8/2004 Kressmann .............. 219/494
* cited by examiner

*Primary Examiner* — Chuong A Luu
*Assistant Examiner* — Robert Bachner

(57) ABSTRACT

An intelligent electric kettle includes a heating element for heating water contained in the intelligent electric kettle, a sensor for sensing the temperature of the water, and a control unit being configured to collect data during the operation of the intelligent electric kettle. The control unit is also configured to execute a predetermined program and calculate a cut-off temperature based on the data and a predetermined target temperature. The control unit is further configured to turn off the electric power provided to the heating element when the temperature of the water sensed by the sensor is equal to or greater than the calculated cut-off temperature.

20 Claims, 14 Drawing Sheets

INTELLIGENT ELECTRIC KETTLE

FIELD OF THE PATENT APPLICATION

The present application generally relates to household appliances and more specifically to an intelligent electric kettle that achieves high precision temperature control.

BACKGROUND

A household electric kettle usually has a heating element which is mounted at the bottom of a water tank through a heat conducting base. A conventional electric kettle typically uses a bi-metal temperature sensor (also known as a thermostat) to sense the water temperature and the steam when the water is boiled, and then cut off the electric power if the water temperature reaches the bi-metal action temperature point or if sufficient amount of steam is detected. Some modern electric kettles use more precise electronic temperature sensors such as the NTC (Negative Temperature Coefficient) resistors (thermistors), which are capable of sensing the water temperature through a very wide range of points instead of just one point. In some cases, the control systems of the electric kettles are configured to take into account the temperature rising rate in addition to the water's absolute temperature value so that the control precision is greatly improved. However, the heating system of an electric kettle is a very complicated energy balancing system. The heat generated by the heating element may be decomposed into the following main components:
a) Energy for heating up the water in the water tank;
b) Energy stored in the heat conducting base;
c) Energy dissipated through the outer case of the water tank and related to the case material and the case mass; and
d) Energy dissipated by emission through the surface the outer case and related to the surface area and the color of the water tank's body.

All of the above factors will affect the water temperature during the heating up and warmth keeping cycle, which may increase the difficulty of precisely controlling the water temperature. For example, the energy stored in the heat conducting base may increase the water temperature by a certain amount after the power supply is cut off, which causes the water temperature to overshoot. The choice of the material of the outer case may affect the water temperature significantly because energy loss is very serious when the water temperature is high. All these factors and effects should be taken into consideration in the design of electric kettles.

SUMMARY

The present patent application is directed to an intelligent electric kettle. In one aspect, the intelligent electric kettle includes a heating element for heating water contained in the intelligent electric kettle; a sensor for sensing the temperature of the water; and a control unit configured to collect data during the operation of the intelligent electric kettle, to execute a predetermined program and calculate a cut-off temperature based on the data and a predetermined target temperature, and to turn off the electric power provided to the heating element when the temperature of the water sensed by the sensor is equal to or greater than the calculated cut-off temperature.

The data that the control unit collects may include the working power of the heating element and the calculated cut-off temperature decreases with the increase of the working power of the heating element.

The intelligent electric kettle may further include a heat conducting base for conducting heat from the heating element to the water. The data that the control unit collects includes the mass of the heat conducting base, and the calculated cut-off temperature decreases with the increase of the mass of the heat conducting base. The data that the control unit collects may include the surface area of the heat conducting base, and the calculated cut-off temperature increases with the increase of the surface area of the heat conducting base.

The data that the control unit collects may include the surface area of a body of the intelligent electric kettle, and the calculated cut-off temperature increases with the increase of the surface area of the body of the intelligent electric kettle.

The data that the control unit collects may include the heat conductivity and the mass of a body of the intelligent electric kettle, and the calculated cut-off temperature increases with the increase of the heat conductivity and the mass of the body of the intelligent electric kettle.

The data that the control unit collects may include the temperature delay of the sensor, and the calculated cut-off temperature increases with the decrease of the temperature delay of the sensor.

The intelligent electric kettle may further include a switch, the switches being configured to be operated by a user to control the intelligent electric kettle on a preset course stored in the control unit correspondingly. The preset course may include a predetermined target temperature or a predetermined total operating time. If a predetermined target temperature is stored in the control unit, the predetermined target temperature is used by the control unit in calculating the cut-off temperature. If a predetermined total operating time is stored in the control unit, the control unit is configured to turn off the electric power provided to the heating element after the electric power has been provided to the heating element after a period of the predetermined total operating time.

In another aspect, the intelligent electric kettle includes a heating element for heating water contained in the intelligent electric kettle; a heat conducting base for conducting heat from the heating element to the water; a sensor for sensing the temperature of the water; a switches being configured to be operated by a user to control the intelligent electric kettle on a preset course correspondingly, the preset course including a predetermined target temperature; and a control unit configured to collect data during the operation of the intelligent electric kettle, to execute a predetermined program and calculate a cut-off temperature based on the data and the predetermined target temperature, and to turn off the electric power provided to the heating element when the temperature of the water sensed by the sensor is equal to or greater than the calculated cut-off temperature.

In yet another aspect, the intelligent electric kettle includes a heating element for heating water contained in the intelligent electric kettle; a heat conducting base for conducting heat from the heating element to the water; a sensor for sensing the temperature of the water; a switch being configured to be operated by a user to control the intelligent electric kettle on a preset course correspondingly, the preset course including a predetermined total operating time; and a control unit configured to store the preset course, to collect data during the operation of the intelligent electric kettle, to execute a predetermined program and thereby calculate a cut-off temperature based on the data and a predetermined target temperature, and to turn off the electric power provided to the heating element when the temperature of the water sensed by the sensor is equal to or greater than the calculated cut-off temperature or after the electric power has been provided to the heating element after a period of the predetermined total operating time.

BRIEF DESCRIPTION OF THE DRAWINGS

FIG. 9 is a flow chart that illustrates a preset heating course that the intelligent electric kettle depicted in FIG. 1 may be operated on.

DETAILED DESCRIPTION

Reference will now be made in detail to a preferred embodiment of the intelligent electric kettle disclosed in the present patent application, examples of which are also provided in the following description. Exemplary embodiments of the intelligent electric kettle disclosed in the present patent application are described in detail, although it will be apparent to those skilled in the relevant art that some features that are not particularly important to an understanding of the intelligent electric kettle may not be shown for the sake of clarity.

Furthermore, it should be understood that the intelligent electric kettle disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1A:
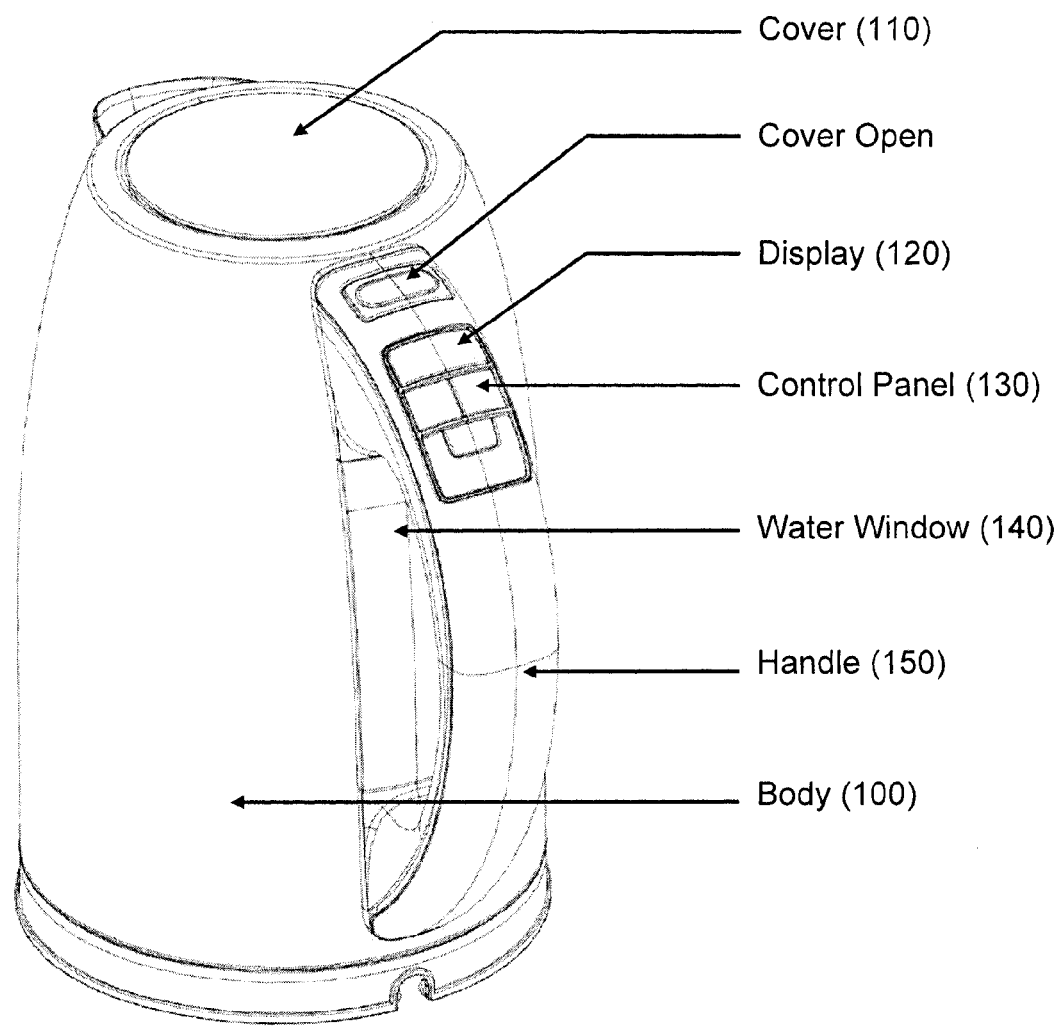
FIG. 1A is a perspective view of an intelligent electric kettle according to an embodiment of the present patent application.
Figure 1B:
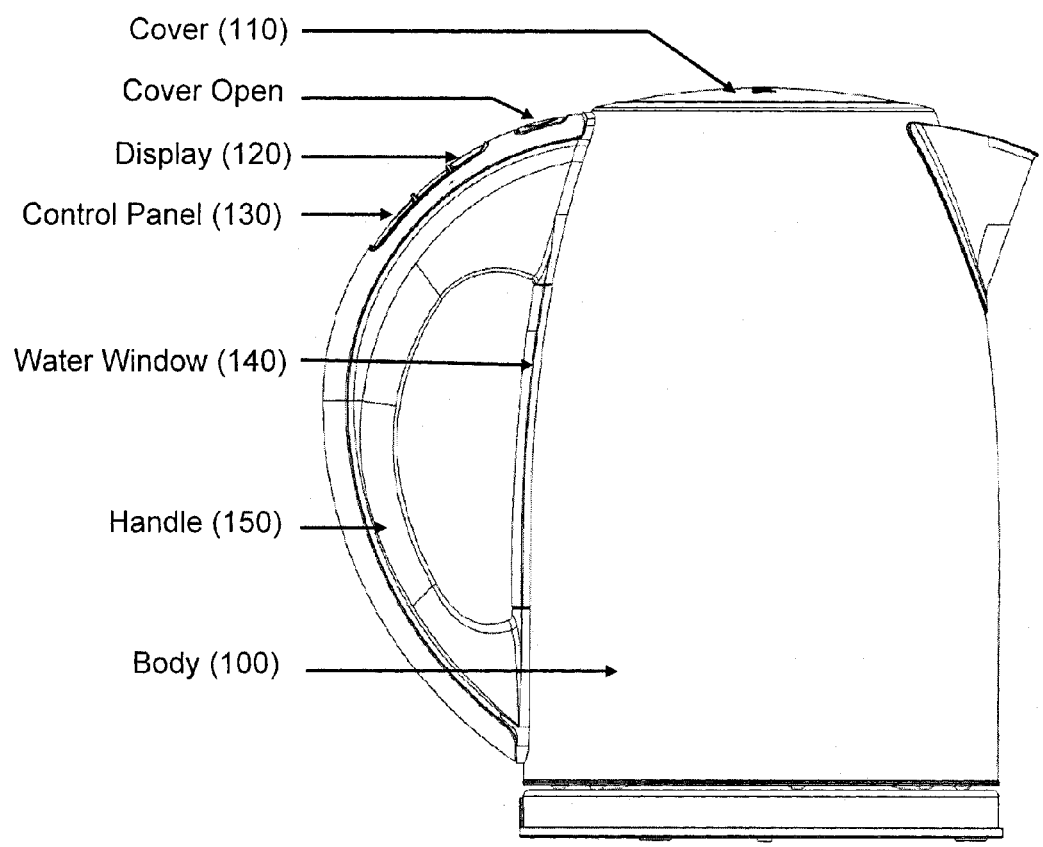
FIG. 1B is a perspective side view of the intelligent electric kettle depicted in FIG. 1.
Figure 1C:
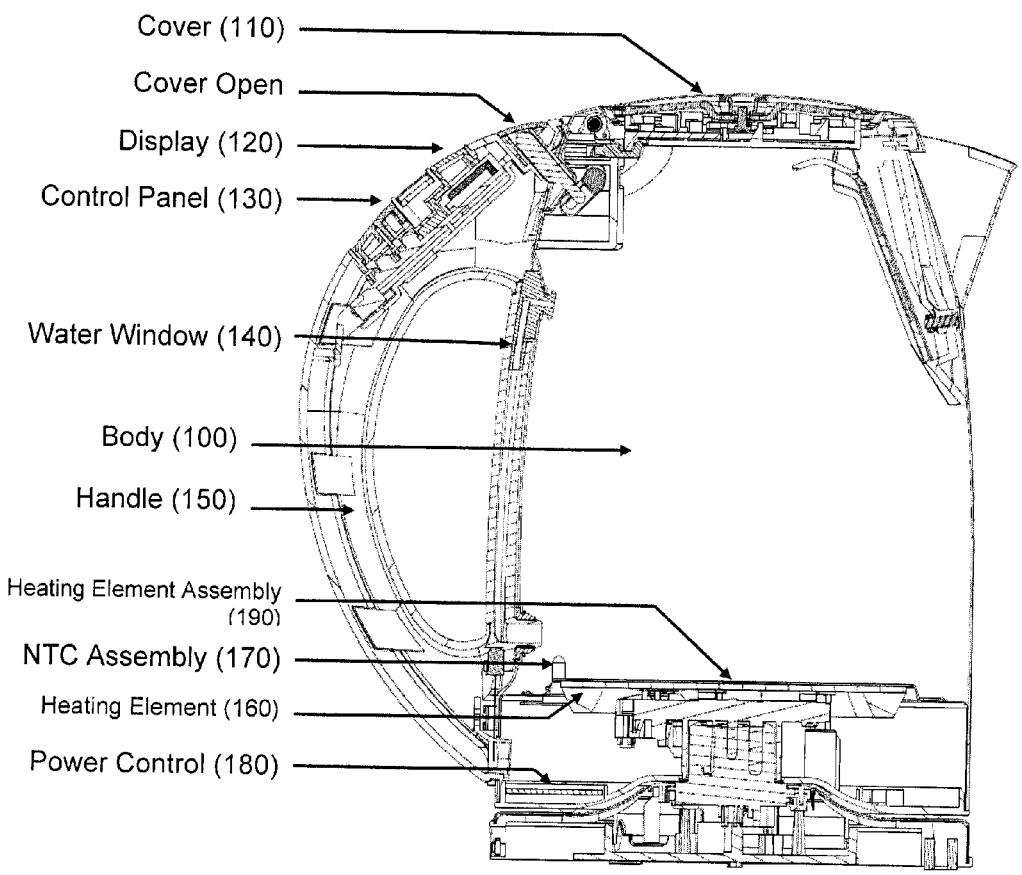
FIG. 1C is a perspective transparent view of the intelligent electric kettle depicted in FIG. 1.

FIG. 1A is a perspective view of an intelligent electric kettle according to an embodiment of the present patent application. FIG. 1B is a perspective side view of the intelligent electric kettle depicted in FIG. 1. FIG. 1C is a perspective transparent view of the intelligent electric kettle depicted in FIG. 1. Referring to FIGS. 1A-1C, the intelligent electronic kettle includes a heating element assembly 190 mounted under a water tank, a power supply and a heating power control PCBA (printed circuit board assembly) 180, a NTC (Negative Temperature Coefficient) assembly 170, a control panel 130 and a display 120. The heating element assembly 190 includes a heating element 160 and a heat conducting base which is a media for heat conduction from the heating element 160 to the bottom of the water tank. The display 120 includes a digital display (LCD or LED type) and a plurality of LED indicators.

Figure 3:
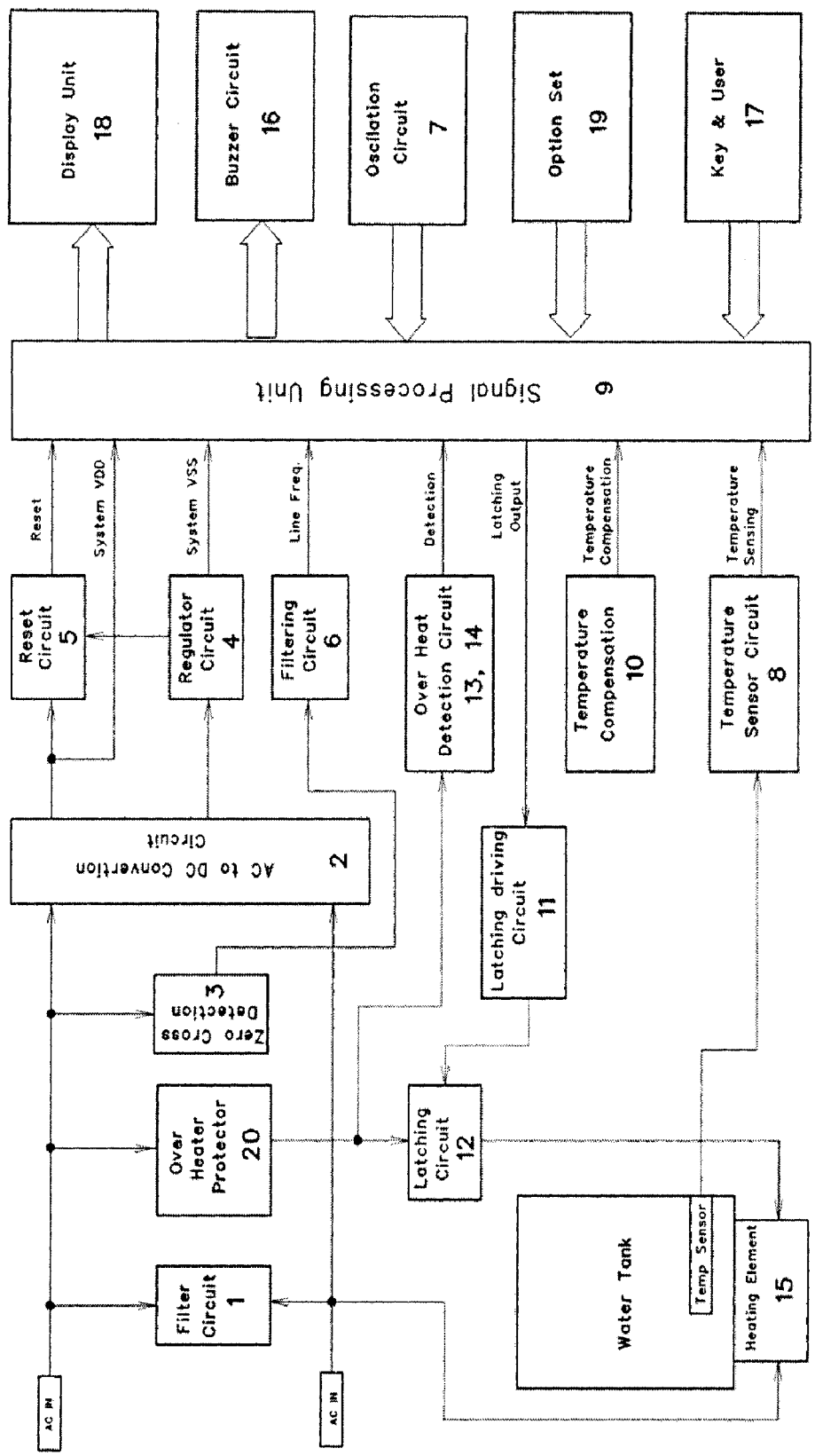
FIG. 3 is a functional block diagram of the intelligent electric kettle depicted in FIG. 1.
Figure 4:
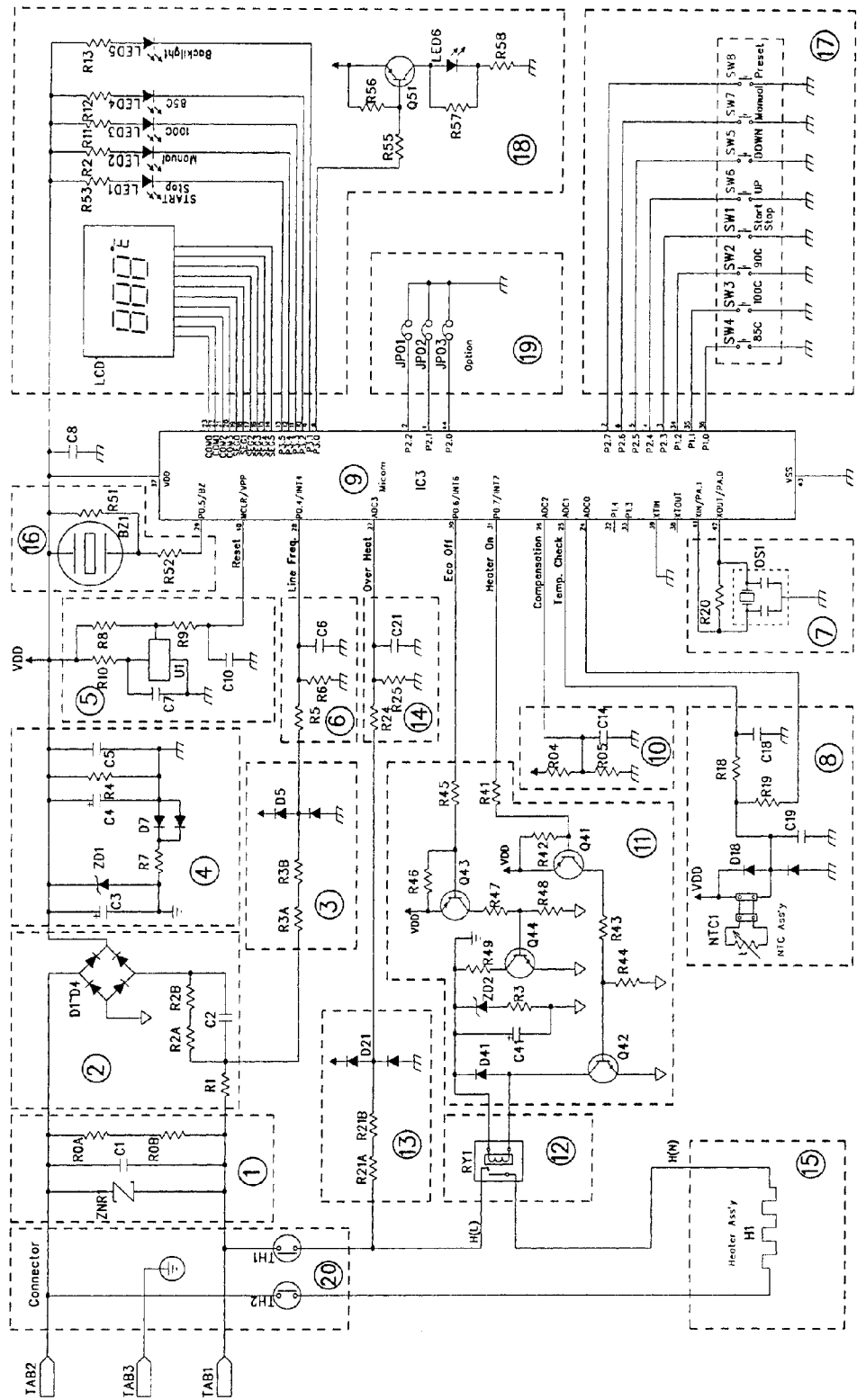
FIG. 4 is a circuit schematic diagram of the intelligent electric kettle depicted in FIG. 1.

FIG. 3 is a functional block diagram of the intelligent electric kettle depicted in FIG. 1. FIG. 4 is a circuit schematic diagram of the intelligent electric kettle depicted in FIG. 1. Referring to FIG. 3 and FIG. 4, incoming alternating current (AC) is converted to direct current (DC) by a converter circuit 2 and applied to the electronic portions of the intelligent electric kettle. A regulator circuit 4 conditions and regulates the DC provided to a micro-controller 9. Once a heating cycle is started after power up, the micro-controller 9 is configured to provide a latching signal to a latching driving circuit 11, which in turn applies DC current to the coil of a latching circuit 12. Together, the micro-controller 9, the latching driving circuit 11 and the latching circuit 12 maintain power to the kettle heating element 15. The micro-controller 9 is also configured to shut off the power supplied to the heating element 15 under certain conditions which will be described in detail hereafter.

Referring to FIG. 4, a zero cross detection circuit 3 and a filtering circuit 6 are configured to provide a shaped signal to the micro-controller 9 corresponding to each zero-cross of the household AC current. This shaped signal is used by the micro-controller 9 to synchronize the latching signal provided to the latching driving circuit 11 with the household AC for the purpose of prolonging the life cycles of the relay switches. The micro-controller 9 is configured to send the signals to the latching driving circuit 11 to turn on or turn off the heating element 15.

An oscillation circuit 7 is configured to provide high frequency clock pulses which the micro-controller 9 uses to synchronize its internal functions. A temperature sensing circuit 8 including a temperature sensor (NTC1) is configured as a water temperature sensor to sense the water temperature during the operating mode. A buzzer circuit 16 is configured to generate an audible indication of the working conditions of the electric kettle to a user. A reset circuit 5 is configured to provide a reset signal to the micro-controller 9 at the system power up so as to initialize the micro-controller 9 and set the micro-controller 9 in a standby mode.

The micro-controller 9 preferably incorporates a microprocessor, a programmable read-only memory (PROM) or erasable programmable read-only memory (EPROM) and a random access memory (RAM) as well as buffers and circuitry for the reception and manipulation of various inputs and outputs. The RAM memory is a volatile, or as known in the art, temporary shortage for data. Resetting the micro-controller or removing power supplied to the intelligent electronic kettle will erase the content of the RAM after a certain period of time. The microprocessor, the memory, the buffers and the circuitry are typically incorporated into a single integrated circuit or chip package, which is then referred to as the micro-controller. In the preferred embodiment, sets of instructions or programs are installed in the programmable memory. These instructions will be discussed hereafter with references to FIGS. 5-12.

Figure 2:
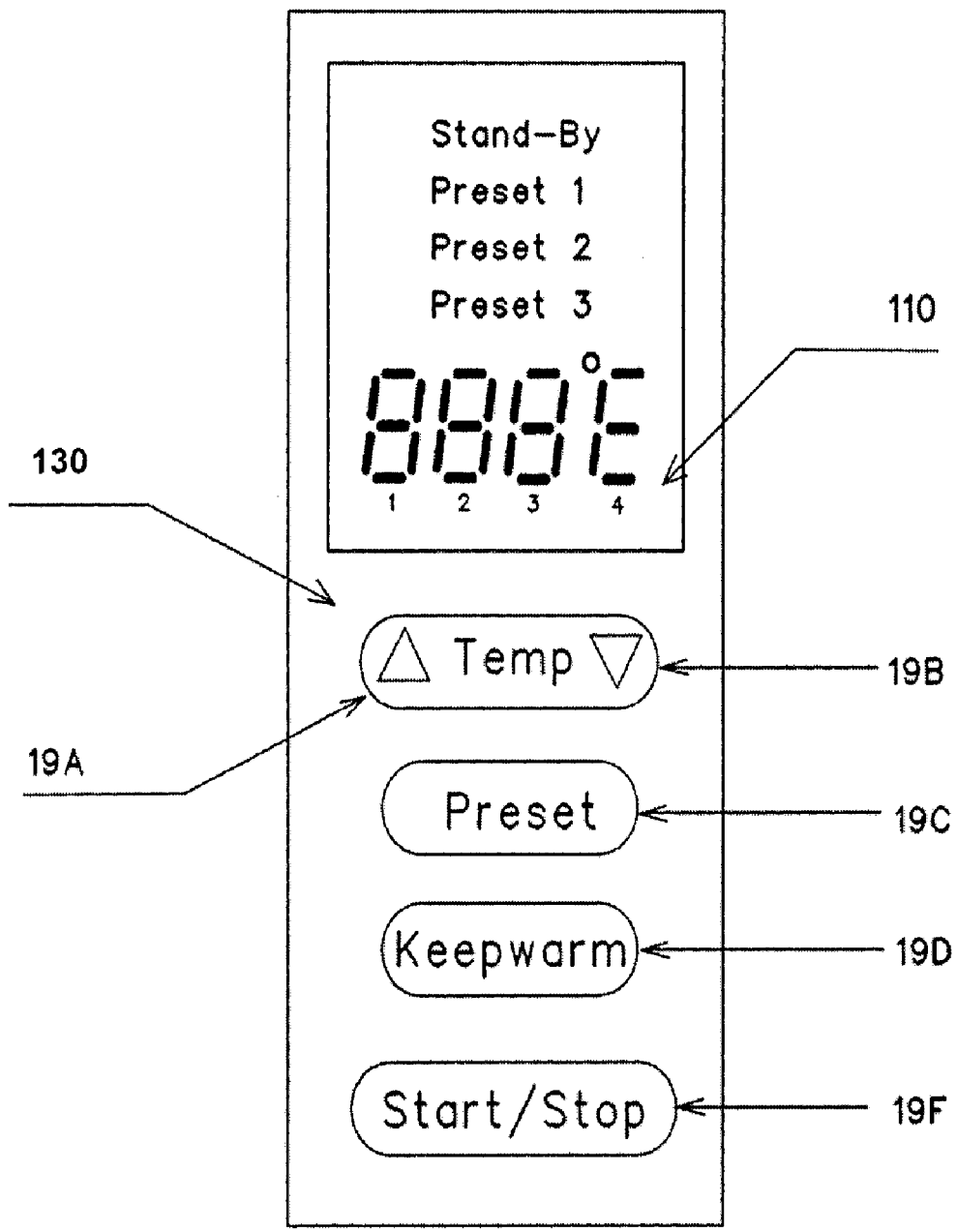
FIG. 2 is a partial view of a control panel of the intelligent electric kettle depicted in FIG. 1.

Referring to FIG. 3 and FIG. 4, the keyboard 17 and the display portion 18 are incorporated into a control panel 130 to provide a user interface for a user to operate the intelligent electric kettle. A display is disposed on the control panel 130, as illustrated in FIG. 2, and the display preferably includes a digital display 110 and LED indicators for standby indication and backlighting purposes. The display 120 shows, preferably in digital format, the results of the elapsed or countdown time in the micro-controller programs, depending on the specific circumstances. The display 110 also indicates several functional conditions, such as a preset course selected by a user. In this embodiment, the intelligent electronic kettle has several preset courses, each of which combines different temperature and time settings for the user to select. The preset courses are stored in the PROM or EPROM of the microcontroller 9 in this embodiment and may be stored in a memory unit separated from the microcontroller 9 as well. The above-mentioned interface simplifies the operation of the intelligent electric kettle.

The remainder of the control panel 130 is essentially dedicated to a plurality of contact-type switches. These switches are normally open and are closed by pressure applied to the surface of the control panel 130 by the user. The functions of these switches are illustrated by FIGS. 2 and 4. The micro-controller 9 contains programmed instructions for responding to the closing of the switches. The ease of use and overall utility of the intelligent electric kettle are enhanced by the particular programmed instructions installed in the micro-controller 9.

Figure 5:
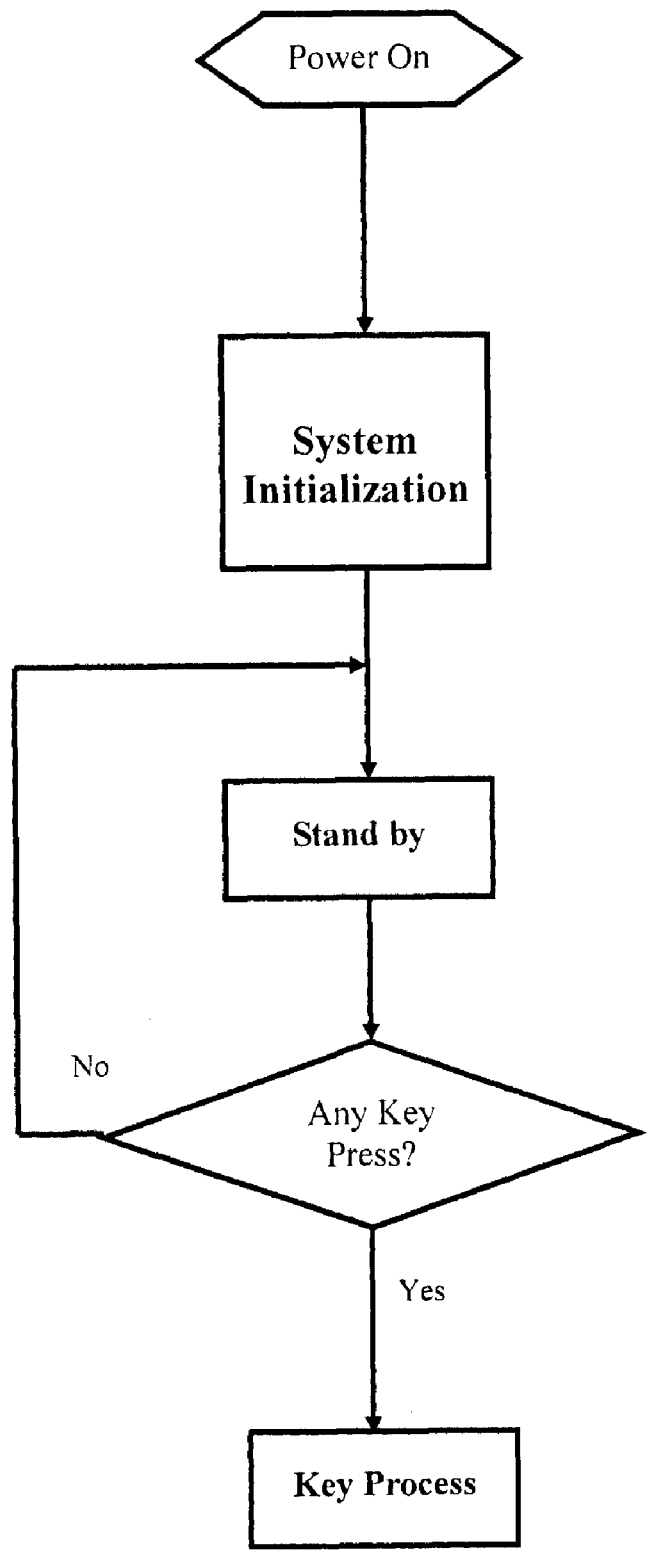
FIG. 5 is a flow chart that illustrates the overall operation of the intelligent electric kettle depicted in FIG. 1.

FIG. 5 is a flow chart that illustrates the overall operation of the intelligent electric kettle depicted in FIG. 1. Referring to FIG. 5, upon initialization, the micro-controller 9 enters a standby mode.

Figure 6:
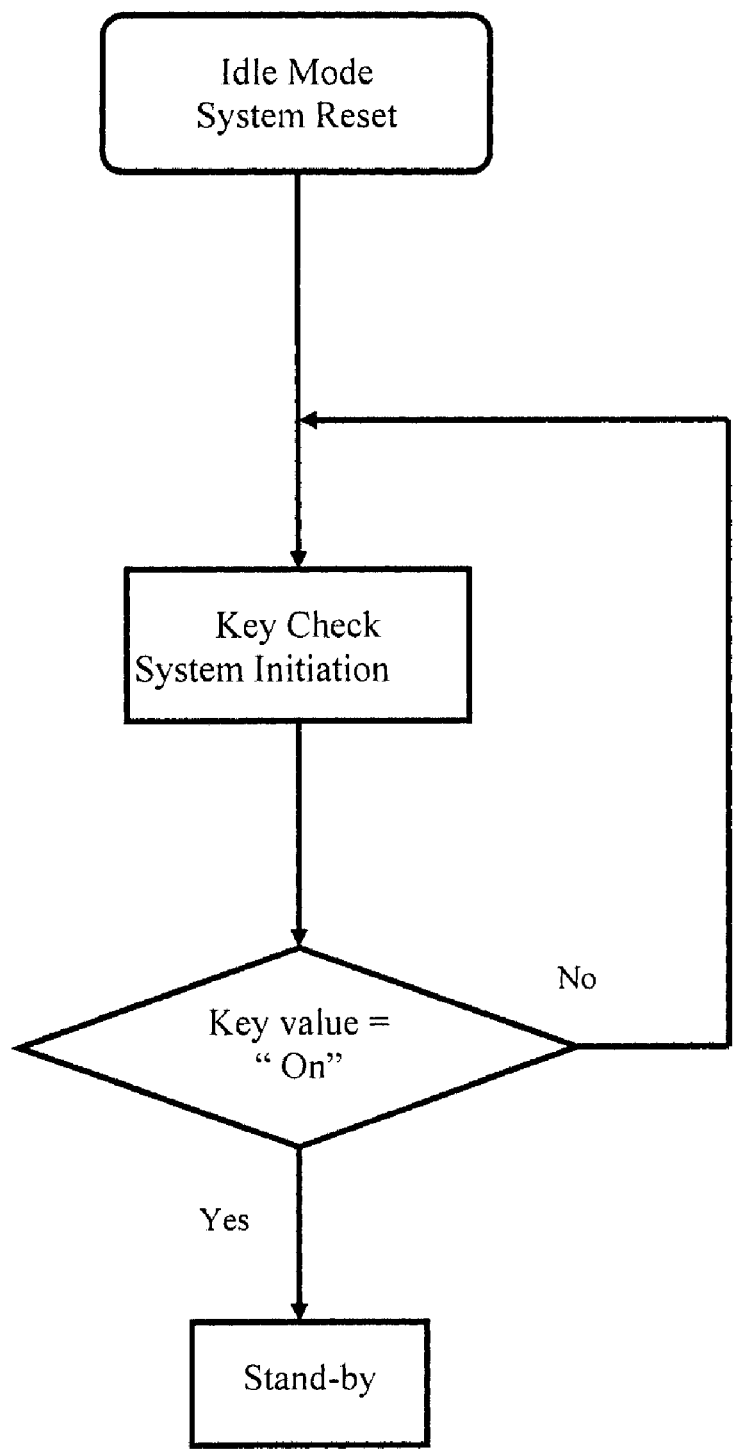
FIG. 6 is a flow chart that illustrates the operation of the intelligent electric kettle depicted in FIG. 1 in an idle mode.

FIG. 6 is a flow chart that illustrates the operation of the intelligent electric kettle in an idle mode. Referring to FIG. 6, in the idle mode, the micro-controller 9 of the intelligent electric kettle is configured to response to the closing of the function switches. If no function switch is pressed, the micro-controller remains in the idle mode. If any switch is pressed during the idle mode, the micro-controller 9 will change the system from the idle mode to the standby mode.

Figure 7:
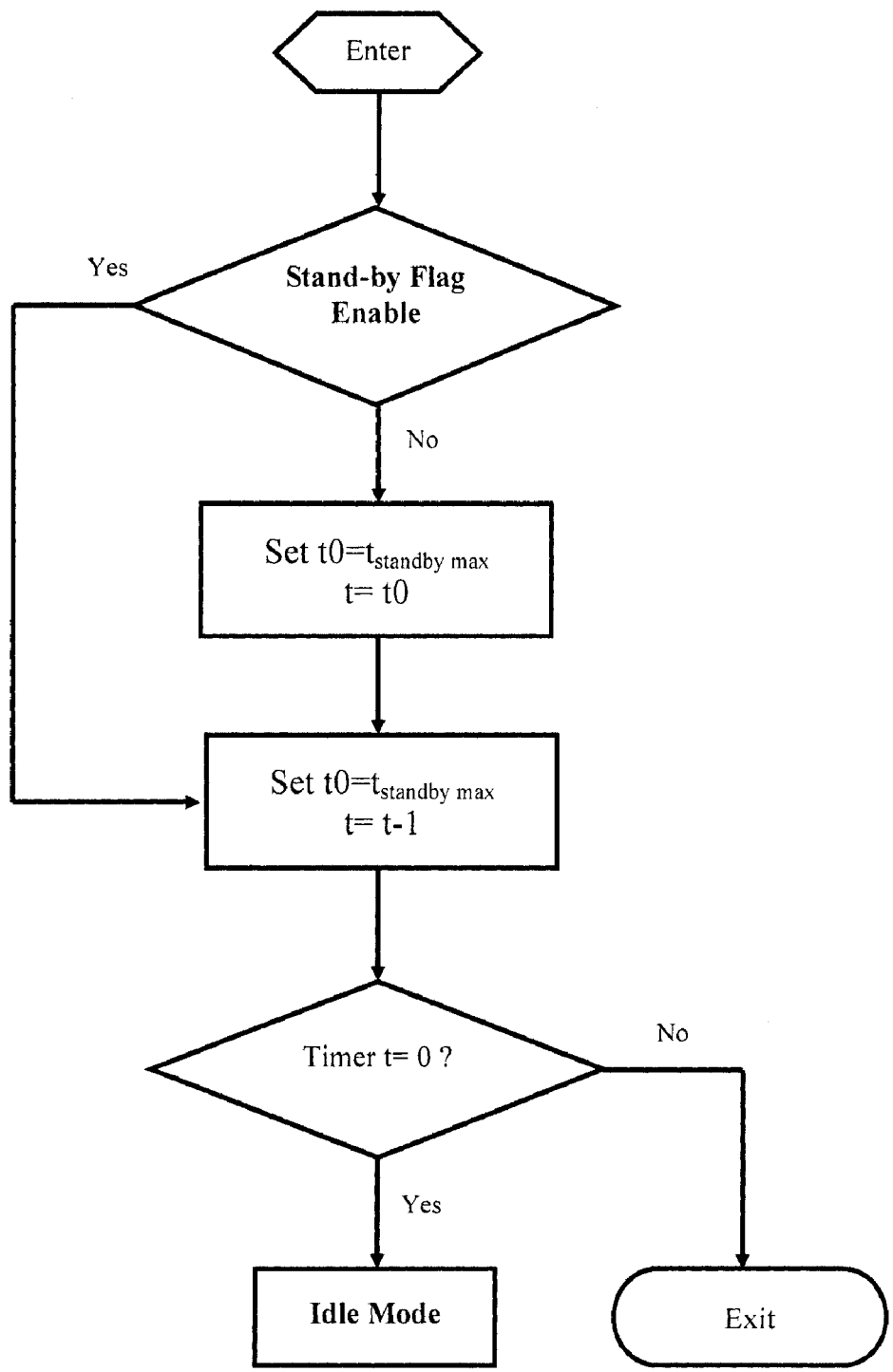
FIG. 7 is a flow chart that illustrates the operation of the intelligent electric kettle depicted in FIG. 1 in a standby mode.

FIG. 7 is a flow chart that illustrates the operation of the intelligent electric kettle in the standby mode. The micro-controller 9 is programmed with a predetermined standby time $t_{standby\ max}$. In the standby mode, if no switches are closed before the predetermined standby time $t_{standby\ max}$ expires, the micro-controller 9 will turn the intelligent electric kettle into the idle mode illustrated in FIG. 6.

Figure 8:
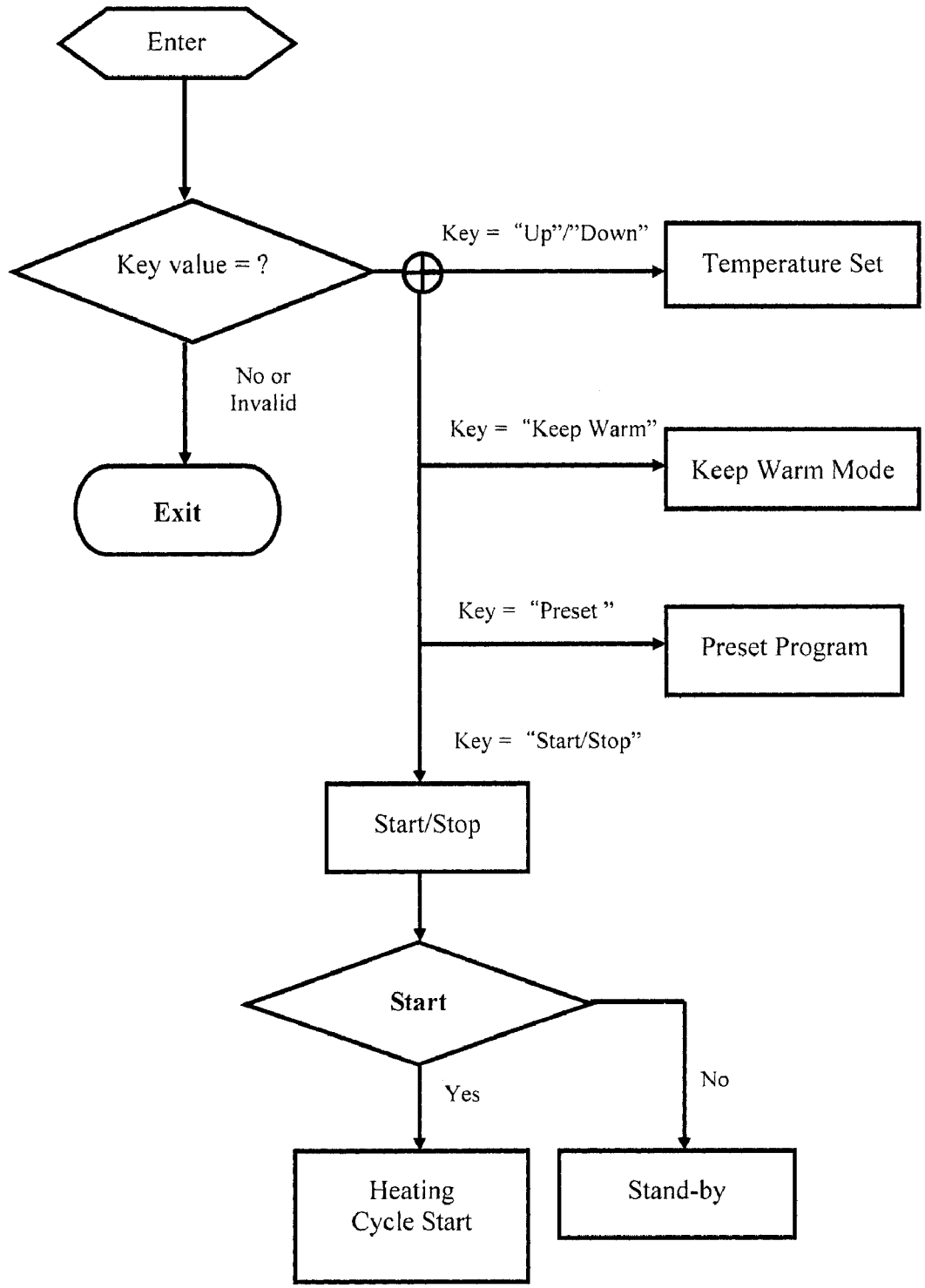
FIG. 8 is a flow chart that illustrates a count-down timer setting program that the intelligent electric kettle depicted in FIG. 1 executes.

FIG. 8 is a flow chart that illustrates the operation setting program that the micro-controller executes. Once the key is pressed under any mode, the parameter setting program will be executed and the user can easily set the desired running parameter through the "Up" and "Down", "Keep Warm" "Preset" keys. The user-selected temperature is stored in the PROM or EPROM of the microcontroller 9. The micro-controller 9 proceeds to execute program to heat up the water until the cut off temperature is reached.

Figure 9:
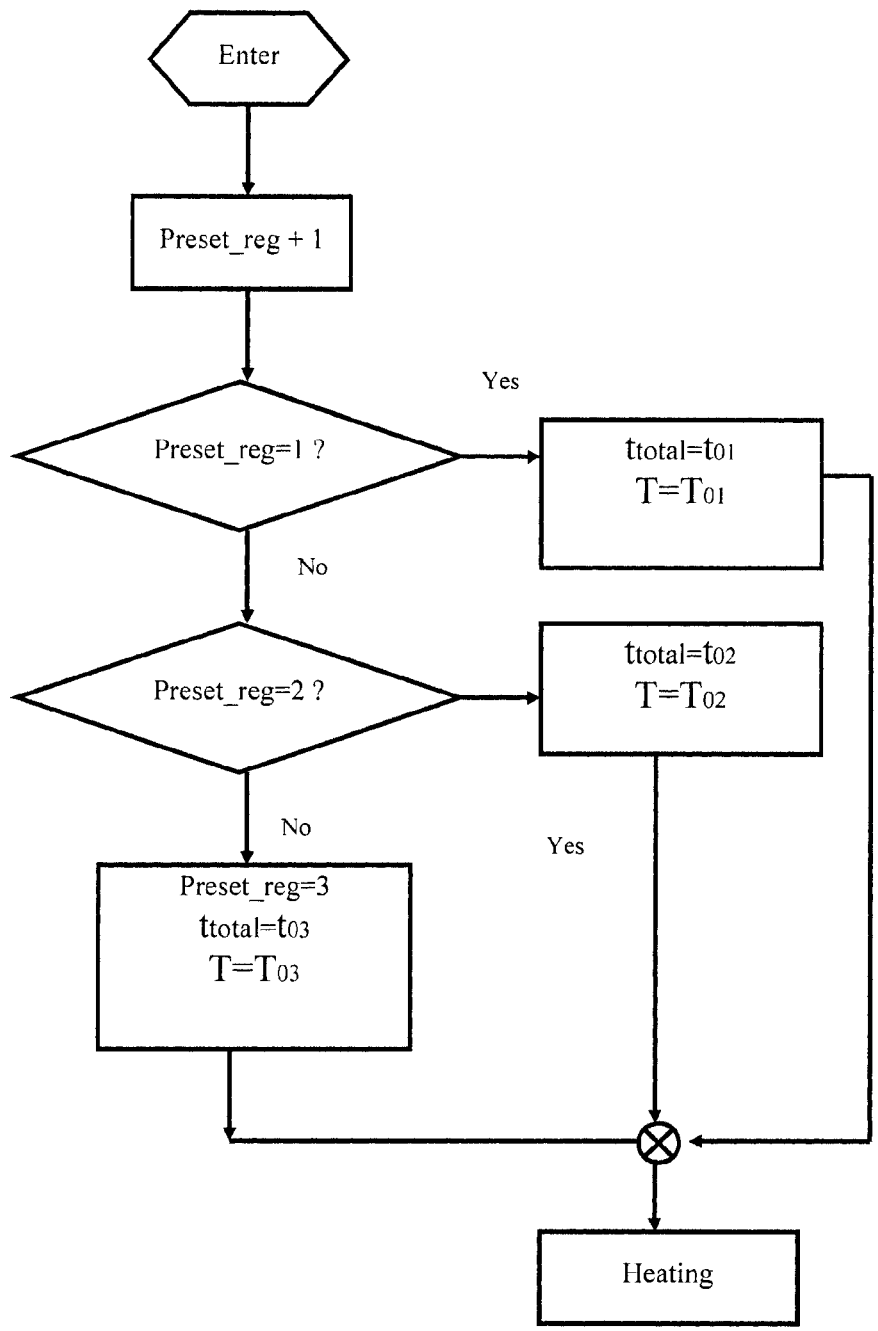

FIG. 9 is a flow chart that illustrates a preset heating course that the intelligent electric kettle in this embodiment may be operated on. Once the preset key is pressed under the standby or operating mode, at least one predetermined heating course can be operated on. The predetermined course is preset with the target water temperature and the total operating time $t_{total}$.

Figure 10:
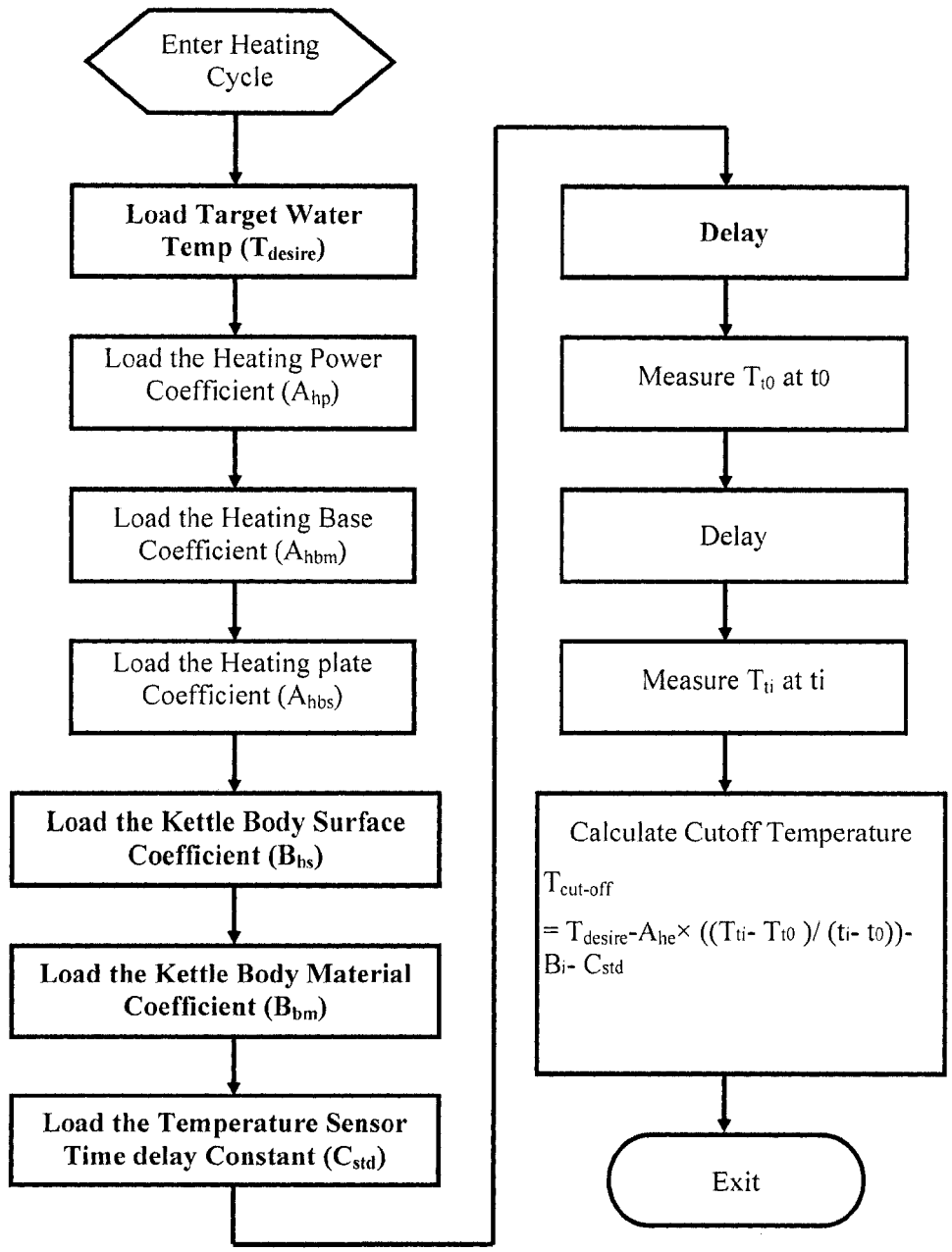
FIG. 10 is a flow chart that illustrates a heating cycle control program that the intelligent electric kettle depicted in FIG. 1 executes.

FIG. 10 is a flow chart that illustrates a heating cycle control program that the intelligent electric kettle executes. Once the heating cycle is requested to be started, the micro-controller 9 will receive a temperature signal through the temperature sensing circuit (including the temperature sensor) and then compare the temperature signal with the user desired target water temperature. The heating cycle can proceed only when the measured water temperature is lower than the user desired water temperature.

Figure 11:
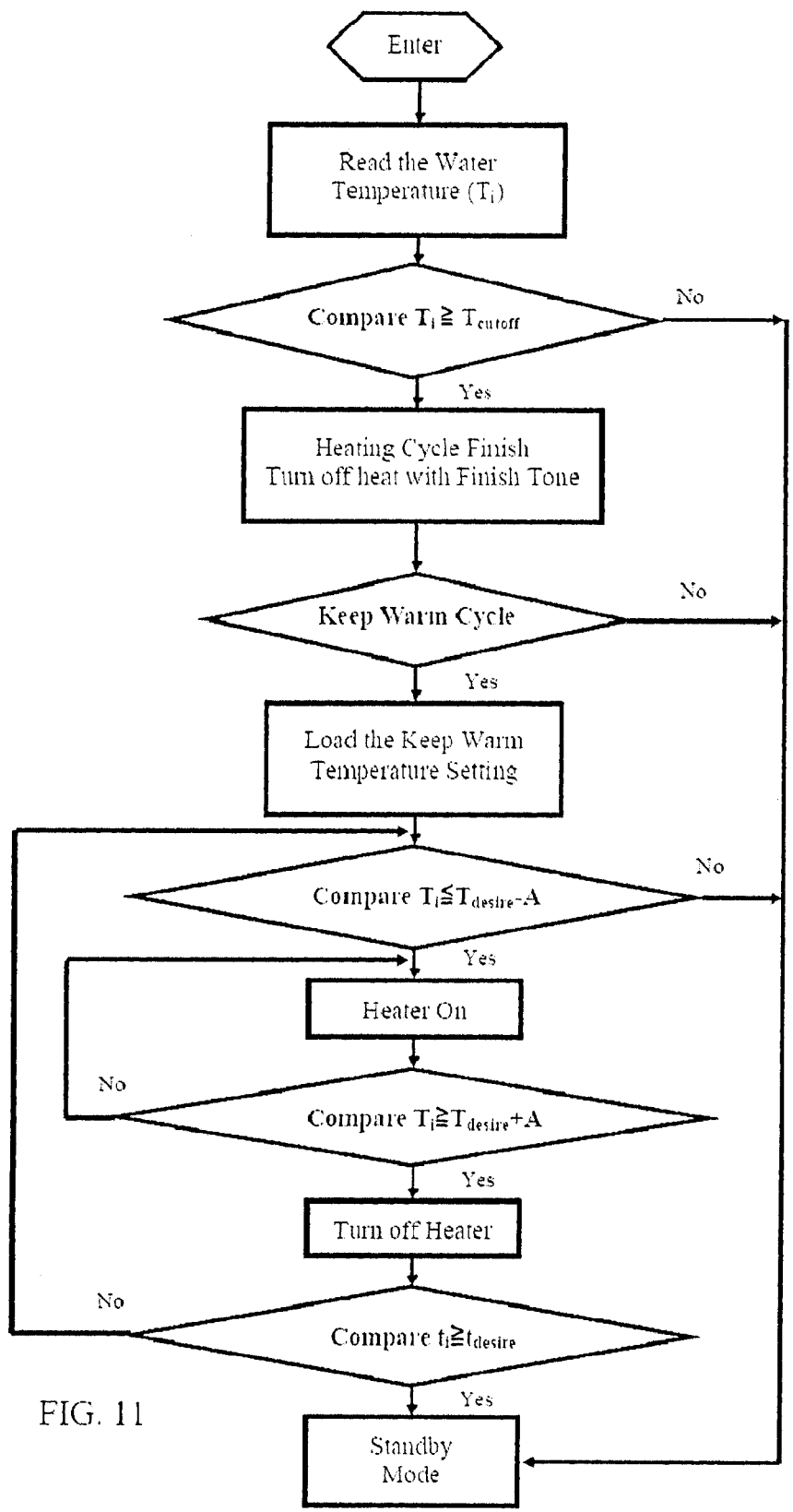
FIG. 11 is a flow chart that illustrates the detailed heating cycle control program that the intelligent electric kettle depicted in FIG. 1 executes.

FIG. 11 is a flow chart that illustrates the detailed heating cycle control program that the intelligent electric kettle executes. Once the heating cycle is started, the micro-controller 9 will receive the temperature signal through the temperature sensing circuit and the temperature sensor, and all other related factors which includes the heating power, the area of the heating surface, the mass and material of the heat conducting base, the material and surface area of the kettle body exposed in the air and a temperature sensor time delay parameter derived from the water temperature sensing. All these parameters will be taken in to account and calculated to give a precise cut-off temperature during the heating and warmth keeping cycle so as to achieve a high precision temperature control with very small error tolerance.

Figure 12:
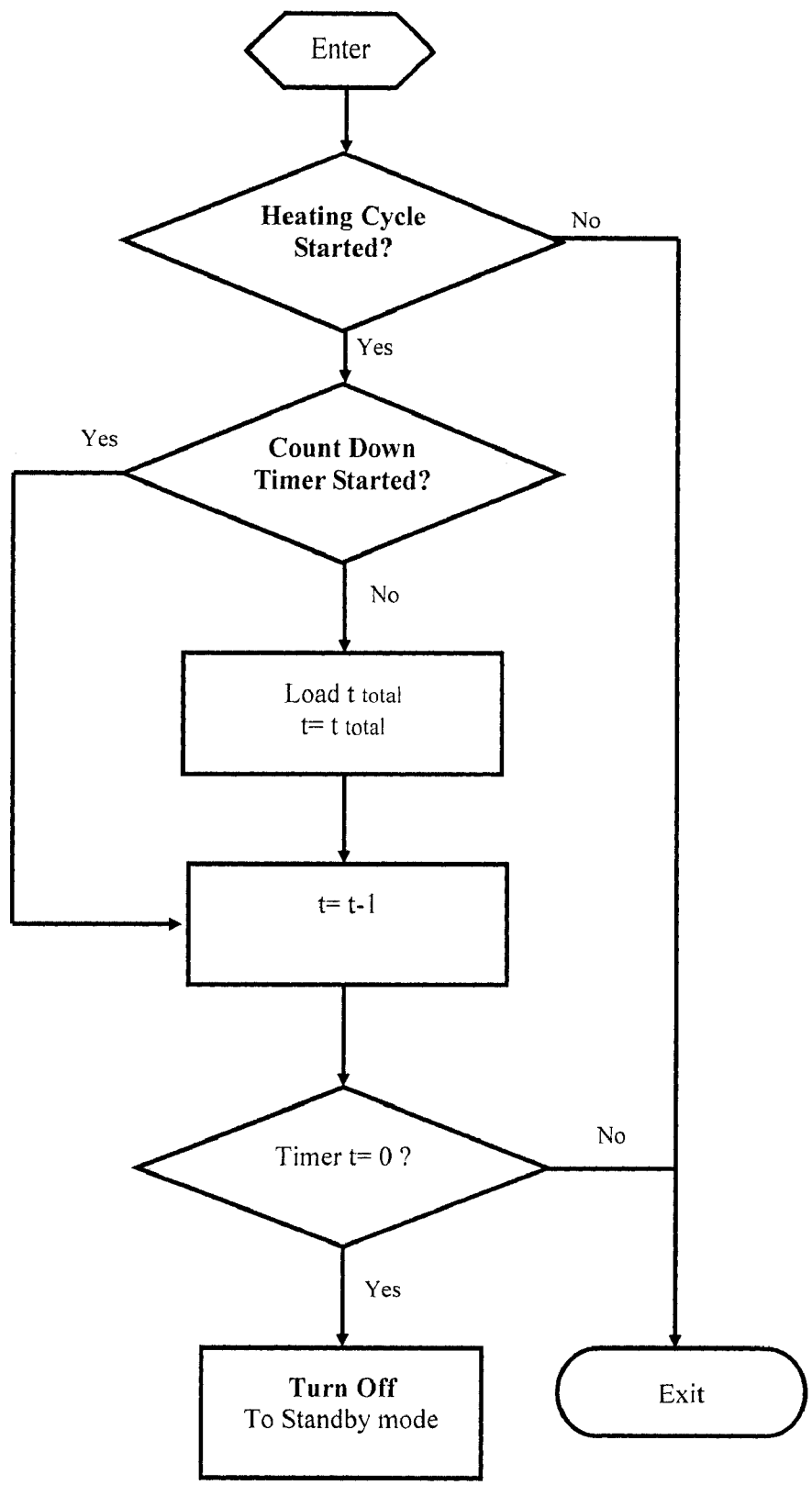
FIG. 12 is a flow chart that illustrates a maximum operating time control program that the intelligent electric kettle depicted in FIG. 1 executes.

FIG. 12 is a flow chart that illustrates a maximum operating time control program that the intelligent electric kettle executes. Once the heating cycle is started, the micro-controller 9 is configured to start a countdown timer. Once the countdown reaches zero, the micro-controller 9 will cut off the power supplied to heating element and the intelligent electric kettle will go back to the standby mode.

In this embodiment, the cut-off temperature is calculated by the micro-controller 9. The calculation formula used by the micro-controller 9 for calculating a very precise cut-off temperature during the electric kettle's heating cycle is the following:

$$T_{cut-off} = T_{desire} - A_{he} \times ((T_{ti} - T_{t0})/(t_i - t_0)) - B_i - C_{std}$$

$T_{cut-off}$: the cut-off temperature during the heating cycle
$T_{desire}$: the desired target temperature set by the user
$A_{he}$: an accumulated coefficient related to the heating element which includes the heating power, the area of the heating surface, the mass and the material of the heat conducting base.

$$A_{he} = A_{hp} + A_{hbm} + A_{hbs}$$

$A_{hp}$: coefficient of the heating power
$A_{hp}$ increases with the increase of the heating electric power.
$A_{hbm}$: coefficient of the mass of heat conducting base
$A_{hbm}$ increases with the increase of the mass of the heat conducting base.
$A_{hbs}$: coefficient of the surface area of the heating element
$A_{hbs}$ increases with the decrease of the area of the heating element.
$T_{t0}$: water temperature measured at t0
$T_{ti}$: water temperature measured at ti
t0, ti: time points when the water temperature is measured
$B_i$: an accumulated constant related to the kettle body surface and the kettle body material.

$$B_i = B_{bs} + B_{bm}$$

$B_{bs}$: coefficient of the kettle body surface
$B_{bs}$ value increases with the decrease of the body surface area.
$B_{bm}$: coefficient of the kettle body material and mass
$B_{bm}$ increases with the decrease of the body material's heat conductivity and the body's mass.
$C_{std}$: a constant of the temperature delay of the temperature sensor.
$C_{std}$ increases with the increase of the temperature delay time of the temperature sensor.

The operation of the intelligent electric kettle in this embodiment is further illustrated by the following four examples.

Example 1

The user desired water temperature $T_{desire} = 90.0°$ C.
The accumulated coefficient of 3000 W of the heating element $$A_{he} = A_{hp} + A_{hbm} + A_{hbs} = 4 \text{ sec}$$

The accumulated constant of the body surface and the body material $$B_i = B_{bs} + B_{bm} = 1.0° \text{ C.}$$

The constant of the temperature delay of temperature sensor $C_{std} = 1.0°$ C.
At the measured point, $T_{t0} = 50°$ C., $T_t = 70°$ C., $t0 = 10$ second, $ti = 70$ second $$(Tti - Tt0)/(ti - t0) = (70 - 50)/60 = 1/3 (° \text{ C./sec}).$$

In this example, the cut-off temperature $T_{cut-off}$ value can be a determined in the following fashion.

$$\begin{aligned} T_{cut-off} &= T_{desire} - A_{he} \times ((T_{ti} - T_{t0})/(ti - t0)) - B_i - C_{std} \\ &= 90.0 - 4 \times 1/3 - 1.0 - 1.0 \\ &= 86.67° \text{ C.} \end{aligned}$$

Under this condition, in order to avoid the water temperature's strong overshoot, the heating element's power will be cut off when the water temperature reaches 86.67° C.

Example 2

In the example 1, if the working power of the heating element is changed from 3000 W to 1500 W, according to the description above, the decrease of the electric power of the heating element will cause the $A_{hp}$ value to decrease, so the accumulated coefficient value $A_{he}$ of 1500 W heating element will be reduced, for instance:

$$A_{he}' = A_{hp}' + A_{hbm} + A_{hbs} = 2.5 \text{ sec}$$

At the measured point $T_{t0} = 50°$ C., $T_t = 70°$ C., $t0 = 10$ second, $ti = 140$ second $$(Tti - Tt0)/(ti - t0) = (70 - 50)/120 = 1/6 (° \text{ C./sec})$$

In this example, the cut-off temperature $T_{cut-off}'$ may be a determined in the following fashion:

$$\begin{aligned} T_{cut\_off}' &= T_{desire} - A_{he}' \times ((Tti - Tt0)/(ti - t0)) - Bi - Cstd \\ &= 90.0 - 2.5 \times 1/6 - 1.0 - 1.0 \\ &= 87.58° \text{ C.} \end{aligned}$$

As a result, the reduction of the heating power will cause the $A_{hp}$ value to decrease and finally cause the cut-off temperature to increase compare with the case of higher heating power. It is understood that changes in the other factors $A_{hbm}$ and $A_{hbs}$ will have similar effects as $A_{hp}$.)

Example 3

Based on the example 1, if the surface area of kettle body is decreased, the $B_{bs}$ value will increase, which will make the accumulated constant of the body surface and the body material $B_i$ increase, for instance:

$$B_1' = B_{bs}' + B_{bm} = 1.5° \text{ C.}$$

In this example, the cut-off temperature $T_{cut-off}'$ may be a determined in the following fashion:

$$\begin{aligned} T_{cut-off}' &= T_{desire} - A_{he} \times ((Tti - Tt0)/(ti - t0)) - B_i' - Cstd \\ &= 90.0 - 4 \times 1/3 - 1.5 - 1.0 \\ &= 86.16° \text{ C.} \end{aligned}$$

As a result, the reduction of the body surface area will cause the cut-off temperature to decrease compared with the case in Example 1, as the heat loss get smaller through the surface body of the kettle. It is understood that changes in the other factor $B_{bm}$ will have similar effects as $B_{bs}$.

Example 4

Based on the example 1, if the constant of the temperature delay $C_{std}$ gets greater, for instance:

$$Cstd' = 2.0° \text{ C.}$$

In this example, the cut-off temperature $T_{cut-off}'$ may be a determined in the following fashion:

$$\begin{aligned} T_{cut\_off}' &= T_{desire} - A_{he} \times ((Tti - Tt0)/(ti - t0)) - B_i - Cstd' \\ &= 90.0 - 4 \times 1/3 - 1.0 - 2.0 \\ &= 85.67° \text{ C.} \end{aligned}$$

As a result, the increase of the temperature delay constant will cause the cut-off temperature to decrease, so as to prevent the water temperature from getting over the target (overshooting) after the power supply is shut off. On the other hand, a reduction of the delay constant, which means the temperature reaction is getting quicker, will make the effect of the sensor delay to the cut-off temperature smaller.

In the above embodiments, many factors such as kettle operating power (Watt), kettle's heat conducting base mass (Kg) and material, case material (Plastic or Metal) and the mass thereof, and etc. are taken into account in the calculation conducted by the micro-controller instead of just the absolute water temperature value and the simple temperature rising rate. Hence high precision water temperature control with very small tolerance (less than 2 degree Celsius) is achieved under the water heating and warmth keeping conditions.

While the present patent application has been shown and described with particular references to a number of embodiments thereof, it should be noted that various other changes or modifications may be made without departing from the scope of the present invention.

What is claimed is:

1. An intelligent electric kettle comprising:
   a heating element for heating water contained in the intelligent electric kettle;
   a sensor for sensing the temperature of the water; and
   a control unit being configured to collect data during the operation of the intelligent electric kettle, the control unit also being configured to execute a predetermined program and calculate a cut-off temperature based on the data and a predetermined target temperature, the control unit further being configured to turn off the electric power provided to the heating element when the temperature of the water sensed by the sensor is equal to or greater than the calculated cut-off temperature, wherein said cut-off temperature, $T_{cut-off}$, is calculated by the formula:

$$T_{cut-off} = T_{desire} - A_{he} \times ((T_{ti} - T_{t0})/(t_i - t_0)) - B_i - C_{std} \quad 5$$

wherein $T_{desire}$ represents the predetermined target temperature set by the user;

wherein $A_{he}$ represents an accumulated coefficient related to the heating element which includes the heating power, the area of the heating surface, the mass and the material of the heat conducting base;

wherein $T_{t0}$ represents water temperature measured at t0;

wherein $T_{ti}$ represents water temperature measured at ti;

wherein t0, ti represent time points when the water temperature is measured;

wherein $B_i$ represents an accumulated constant related to the kettle body surface and the kettle body material; and wherein $C_{std}$ represents a constant of the temperature delay of the temperature sensor.

2. The intelligent electric kettle of claim 1, wherein the data that the control unit collects comprises the working power of the heating element and the calculated cut-off temperature decreases with the increase of the working power of the heating element.

3. The intelligent electric kettle of claim 1 further comprising a heat conducting base for conducting heat from the heating element to the water, wherein the data that the control unit collects comprises the mass of the heat conducting base, and the calculated cut-off temperature decreases with the increase of the mass of the heat conducting base.

4. The intelligent electric kettle of claim 3, wherein the data that the control unit collects comprises the surface area of the heat conducting base, and the calculated cut-off temperature increases with the increase of the surface area of the heat conducting base.

5. The intelligent electric kettle of claim 1, wherein the data that the control unit collects comprises the surface area of a body of the intelligent electric kettle, and the calculated cut-off temperature increases with the increase of the surface area of the body of the intelligent electric kettle.

6. The intelligent electric kettle of claim 1, wherein the data that the control unit collects comprises the heat conductivity and the mass of a body of the intelligent electric kettle, and the calculated cut-off temperature increases with the increase of the heat conductivity and the mass of the body of the intelligent electric kettle.

7. The intelligent electric kettle of claim 1, wherein the data that the control unit collects comprises the temperature delay of the sensor, and the calculated cut-off temperature increases with the decrease of the temperature delay of the sensor.

8. The intelligent electric kettle of claim 1 further comprising a switch, the switch being configured to be operated by a user to control the intelligent electric kettle on a preset course stored in the control unit correspondingly.

9. The intelligent electric kettle of claim 8, wherein the preset course comprises a predetermined target temperature or a predetermined total operating time, if a predetermined target temperature is stored in the control unit, the predetermined target temperature is used by the control unit in calculating the cut-off temperature, and if a predetermined total operating time is stored in the control unit, the control unit is configured to turn off the electric power provided to the heating element after the electric power has been provided to the heating element after a period of the predetermined total operating time.

10. An intelligent electric kettle comprising:
a heating element for heating water contained in the intelligent electric kettle;
a heat conducting base for conducting heat from the heating element to the water;
a sensor for sensing the temperature of the water;
a switch being configured to be operated by a user to control the intelligent electric kettle on a preset course correspondingly, the preset course comprising a predetermined target temperature; and
a control unit being configured to collect data during the operation of the intelligent electric kettle, the control unit also being configured to execute a predetermined program and calculate a cut-off temperature based on the data and the predetermined target temperature, and the control unit further being configured to turn off the electric power provided to the heating element when the temperature of the water sensed by the sensor is equal to or greater than the calculated cut-off temperature, wherein said cut-off temperature, $T_{cut-off}$, is calculated by the formula:

$$T_{cut-off} = T_{desire} - A_{he} \times ((T_{ti} - T_{t0})/(T_i - t_0)) - B_i - C_{std}$$

wherein $T_{desire}$ represents the predetermined target temperature set by the user;

wherein $A_{he}$ represents an accumulated coefficient related to the heating element which includes the heating power, the area of the heating surface, the mass and the material of the heat conducting base;

wherein $T_{t0}$ represents water temperature measured at t0;

wherein $T_{ti}$ represents water temperature measured at ti;

wherein t0, ti represent time points when the water temperature is measured;

wherein $B_i$ represents an accumulated constant related to the kettle body surface and the kettle body material; and wherein $C_{std}$ represents a constant of the temperature delay of the temperature sensor.

11. The intelligent electric kettle of claim 10, wherein the data that the control unit collects comprises the working power of the heating element and the calculated cut-off temperature decreases with the increase of the working power of the heating element.

12. The intelligent electric kettle of claim 10, wherein the data that the control unit collects comprises the mass of the heat conducting base, and the calculated cut-off temperature decreases with the increase of the mass of the heat conducting base.

13. The intelligent electric kettle of claim 10, wherein the data that the control unit collects comprises the surface area of the heat conducting base, and the calculated cut-off temperature increases with the increase of the surface area of the heat conducting base.

14. The intelligent electric kettle of claim 10, wherein the data that the control unit collects comprises the surface area, the heat conductivity and the mass of a body of the intelligent electric kettle, and the calculated cut-off temperature increases with the increase of the surface area, the heat conductivity and the mass of the body of the intelligent electric kettle respectively.

15. The intelligent electric kettle of claim 10, wherein the data that the control unit collects comprises the temperature delay of the sensor, and the calculated cut-off temperature increases with the decrease of the temperature delay of the sensor.

16. An intelligent electric kettle comprising:
a heating element for heating water contained in the intelligent electric kettle;

a heat conducting base for conducting heat from the heating element to the water;

a sensor for sensing the temperature of the water;

a switch being configured to be operated by a user to control the intelligent electric kettle on a preset course correspondingly, the preset course comprising a predetermined total operating time; and a control unit being configured to store the preset course and to collect data during the operation of the intelligent electric kettle, the control unit also being configured to execute a predetermined program and calculate a cut-off temperature based on the data and a predetermined target temperature, and the control unit further being configured to turn off the electric power provided to the heating element when the temperature of the water sensed by the sensor is equal to or greater than the calculated cut-off temperature or after the electric power has been provided to the heating element after a period of the predetermined total operating time, wherein said cut-off temperature, $T_{cut\text{-}off}$, is calculated by the formula:

$$T_{cut\text{-}off} = T_{desire} - A_{he} \times ((T_{ti} - T_{t0})/(t_i - t_0)) - B_i - C_{std}$$

wherein $T_{desire}$ represents the predetermined target temperature set by the user;

wherein $A_{he}$ represents an accumulated coefficient related to the heating element which includes the heating power, the area of the heating surface, the mass and the material of the heat conducting base;

wherein $T_{t0}$ represents water temperature measured at t0;

wherein $T_{ti}$ represents water temperature measured at ti;

wherein t0, ti represent time points when the water temperature is measured;

wherein $B_i$ represents an accumulated constant related to the kettle body surface and the kettle body material; and wherein $C_{std}$ represents a constant of the temperature delay of the temperature sensor.

17. The intelligent electric kettle of claim 16, wherein the data that the control unit collects comprises the mass and the surface area of the heat conducting base, the calculated cut-off temperature decreases with the increase of the mass of the heat conducting base, and the calculated cut-off temperature increases with the increase of the surface area of the heat conducting base.

18. The intelligent electric kettle of claim 16, wherein the data that the control unit collects comprises the working power of the heating element and the calculated cut-off temperature decreases with the increase of the working power of the heating element.

19. The intelligent electric kettle of claim 16, wherein the data that the control unit collects comprises the surface area, the heat conductivity and the mass of a body of the intelligent electric kettle, and the calculated cut-off temperature increases with the increase of the surface area, the heat conductivity and the mass of the body of the intelligent electric kettle respectively.

20. The intelligent electric kettle of claim 16, wherein the data that the control unit collects comprises the temperature delay of the sensor, and the calculated cut-off temperature increases with the decrease of the temperature delay of the sensor.

* * * * *